United States Patent
Nelson et al.

(10) Patent No.: US 11,980,938 B2
(45) Date of Patent: May 14, 2024

(54) BLADED DISK REPAIR PROCESS WITH SHIELD

(71) Applicants: Rolls-Royce Corporation, Indianapolis, IN (US); Rolls-Royce plc, London (GB)

(72) Inventors: Scott Nelson, Indianapolis, IN (US); Martyn Anthony Jones, London (GB); Quinlan Yee Shuck, Indianapolis, IN (US); Peter E. Daum, Indianapolis, IN (US); Nathaniel Ashburn, Indianapolis, IN (US)

(73) Assignees: Rolls-Royce Corporation, Indianapolis, IN (US); Rolls-Royce plc, London (GB)

( * ) Notice: Subject to any disclaimer, the term of this patent is extended or adjusted under 35 U.S.C. 154(b) by 107 days.

(21) Appl. No.: 17/534,111

(22) Filed: Nov. 23, 2021

(65) Prior Publication Data
US 2022/0161326 A1  May 26, 2022

Related U.S. Application Data

(60) Provisional application No. 63/117,750, filed on Nov. 24, 2020.

(51) Int. Cl.
  *B22F 10/25* (2021.01)
  *B22F 10/50* (2021.01)
  (Continued)

(52) U.S. Cl.
  CPC .............. *B22F 10/25* (2021.01); *B22F 10/50* (2021.01); *B23K 26/342* (2015.10);
  (Continued)

(58) Field of Classification Search
  CPC . F01D 5/005; F01D 5/34; F01D 5/284; B23K 26/70; B23K 26/702;
  (Continued)

(56) References Cited

U.S. PATENT DOCUMENTS 3,854,842 A   12/1974  Caudill
4,073,599 A    2/1978  Allen et al.
(Continued)

FOREIGN PATENT DOCUMENTS

EP   1466718 A2   10/2004
EP   1674658 A1    6/2006
(Continued)

OTHER PUBLICATIONS

Jang et al., "Neuro-Fuzzy Modeling and Control," Proceedings of the IEEE, vol. 83, No. 3 , Mar. 1995, 29 pp.
(Continued)

*Primary Examiner* — Moshe Wilensky
(74) *Attorney, Agent, or Firm* — Shumaker & Sieffert, P.A.

(57) ABSTRACT

In some examples, systems and techniques for repairing or otherwise forming a blade of a bladed disk. In one example, a method including positioning a shield member around a perimeter of a partial blade extending from a rotor disk of a bladed disk, the shield member being positioned adjacent to a build surface of the partial blade; and depositing, with the shield member around the perimeter of the partial blade, a material on the build surface using an additive manufacturing technique to form a repaired portion on the build surface of the partial blade.

19 Claims, 11 Drawing Sheets

(51) Int. Cl.
*B23K 26/342* (2014.01)
*B23K 26/70* (2014.01)
*B23P 6/00* (2006.01)
*B28B 1/00* (2006.01)
*B33Y 10/00* (2015.01)
*B33Y 80/00* (2015.01)
*F28F 1/12* (2006.01)
*B23K 101/00* (2006.01)

(52) U.S. Cl.
CPC .......... *B23K 26/703* (2015.10); *B23K 26/706* (2015.10); *B23P 6/007* (2013.01); *B28B 1/001* (2013.01); *B33Y 10/00* (2014.12); *B33Y 80/00* (2014.12); *F28F 1/12* (2013.01); *B23K 2101/001* (2018.08)

(58) Field of Classification Search
CPC ............ B23K 2101/001; B23K 26/342; B23K 26/703; B23K 26/706; F05D 2300/20; F05D 2230/31; F05D 2230/80; B22F 2998/10; B22F 2999/00; B22F 5/009; B22F 7/062; B22F 12/38; B22F 10/25; B22F 10/50; F28F 1/12; B28B 1/001; B33Y 10/00; B33Y 80/00; B23P 6/007
See application file for complete search history.

(56) References Cited

U.S. PATENT DOCUMENTS

| | | |
|---|---|---|
| 4,214,355 A | 7/1980 | Zelahy |
| 4,232,995 A | 11/1980 | Stalker et al. |
| 4,247,254 A | 1/1981 | Zelahy |
| 4,390,320 A | 6/1983 | Eiswerth |
| 4,411,597 A | 10/1983 | Koffel et al. |
| 5,038,014 A | 8/1991 | Pratt et al. |
| 5,183,385 A | 2/1993 | Lee et al. |
| 5,478,537 A | 12/1995 | Laughlin et al. |
| 5,479,704 A | 1/1996 | Richter et al. |
| 5,554,837 A | 9/1996 | Goodwater et al. |
| 6,122,564 A | 9/2000 | Koch et al. |
| 6,146,476 A | 11/2000 | Boyer |
| 6,172,327 B1 | 1/2001 | Aleshin et al. |
| 6,269,540 B1 | 8/2001 | Islam et al. |
| 6,326,585 B1 | 12/2001 | Aleshin et al. |
| 6,376,211 B1 | 4/2002 | Little et al. |
| 6,459,951 B1 | 10/2002 | Griffith et al. |
| 6,502,303 B2 | 1/2003 | Updegrove et al. |
| 6,553,275 B1 | 4/2003 | Mazumder |
| 6,588,103 B2 | 7/2003 | Fernihough et al. |
| 6,811,379 B2 | 11/2004 | Fernihough et al. |
| 7,001,151 B2 | 2/2006 | Wang et al. |
| 7,043,330 B2 | 5/2006 | Toyserkani et al. |
| 7,278,829 B2 | 10/2007 | Roedl et al. |
| 7,286,893 B1 | 10/2007 | Mazumder |
| 7,423,236 B2 | 9/2008 | Suh |
| 7,472,478 B2 | 1/2009 | Graham et al. |
| 7,587,818 B2 | 9/2009 | Gorman et al. |
| 7,600,977 B2 | 10/2009 | Shadbolt et al. |
| 7,704,565 B2 | 4/2010 | Slaughter |
| 7,765,022 B2 | 7/2010 | Mazumder et al. |
| 7,784,668 B2 | 8/2010 | Shubert |
| 7,984,547 B2 | 7/2011 | Steinhardt |
| 8,049,132 B2 | 11/2011 | Bouet et al. |
| 8,085,053 B2 | 12/2011 | Fried |
| 8,091,228 B2 | 1/2012 | Hiskes |
| 8,096,030 B2 | 1/2012 | Graichen |
| 8,383,985 B2 | 2/2013 | Twelves, Jr. et al. |
| 8,452,073 B2 | 5/2013 | Taminger et al. |
| 8,629,368 B2 | 1/2014 | Mazumder et al. |
| 8,684,790 B2 | 4/2014 | Reinmoeller et al. |
| 8,726,501 B2 | 5/2014 | Schoonover et al. |
| 8,875,392 B2 | 11/2014 | Richter |
| 8,996,156 B2 | 3/2015 | Melzer-Jokisch et al. |
| 9,044,827 B2 | 6/2015 | Song et al. |
| 9,061,375 B2 | 6/2015 | Qi et al. |
| 9,085,980 B2 | 7/2015 | Mittendorf et al. |
| 9,126,287 B2 | 9/2015 | Bruck et al. |
| 9,355,441 B2 | 5/2016 | Wersborg et al. |
| 9,943,933 B2 | 4/2018 | Xu et al. |
| 10,406,760 B2 | 9/2019 | Shuck et al. |
| 2001/0002287 A1 | 5/2001 | Kar et al. |
| 2003/0075836 A1 | 4/2003 | Fong |
| 2004/0133298 A1 | 7/2004 | Toyserkani et al. |
| 2004/0166187 A1 | 8/2004 | Fong |
| 2004/0200816 A1 | 10/2004 | Chung et al. |
| 2005/0023256 A1 | 2/2005 | Sankaranarayanan et al. |
| 2005/0040147 A1 | 5/2005 | Hoebel et al. |
| 2005/0133527 A1 | 6/2005 | Dullea et al. |
| 2006/0032840 A1 | 2/2006 | Bagavath-Singh |
| 2006/0054079 A1 | 3/2006 | Withey et al. |
| 2006/0193612 A1 | 8/2006 | Bouet et al. |
| 2007/0175875 A1 | 8/2007 | Uckelmann et al. |
| 2008/0135530 A1 | 6/2008 | Lee et al. |
| 2008/0173624 A1 | 7/2008 | Drechsler et al. |
| 2008/0178994 A1 | 7/2008 | Qi et al. |
| 2008/0201947 A1 | 8/2008 | Richter et al. |
| 2008/0257263 A1 | 10/2008 | Pavloff et al. |
| 2008/0296270 A1 | 12/2008 | Song et al. |
| 2008/0314878 A1 | 12/2008 | Cai et al. |
| 2009/0001059 A1 | 1/2009 | Spallek et al. |
| 2009/0024243 A1 | 1/2009 | Suh |
| 2010/0170878 A1 | 7/2010 | Krause |
| 2010/0176097 A1 | 7/2010 | Zhu |
| 2010/0257733 A1 | 10/2010 | Guo et al. |
| 2011/0061591 A1 | 3/2011 | Stecker |
| 2011/0069301 A1 | 3/2011 | Marzok et al. |
| 2011/0100964 A1 | 5/2011 | Burbaum et al. |
| 2011/0103967 A1 | 5/2011 | Hoebel et al. |
| 2011/0150636 A1 | 6/2011 | Tholen et al. |
| 2013/0104397 A1 | 5/2013 | Bunker |
| 2013/0178952 A1 | 7/2013 | Wersborg et al. |
| 2013/0228560 A1 | 9/2013 | Ume et al. |
| 2013/0298400 A1 | 11/2013 | Munshi et al. |
| 2014/0163717 A1 | 6/2014 | Das et al. |
| 2014/0259589 A1 | 9/2014 | Xu et al. |
| 2014/0339206 A1 | 11/2014 | Ott et al. |
| 2015/0040364 A1 | 2/2015 | Ogasahara et al. |
| 2015/0041025 A1 | 2/2015 | Wescott et al. |
| 2015/0048058 A1 | 2/2015 | Bruck et al. |
| 2015/0079306 A1 | 3/2015 | Schoeneborn et al. |
| 2015/0202717 A1 | 7/2015 | Bruck et al. |
| 2016/0303798 A1 | 10/2016 | Mironets et al. |
| 2018/0111197 A1 | 4/2018 | Romano et al. |
| 2018/0274104 A1 | 9/2018 | Reznik et al. |

FOREIGN PATENT DOCUMENTS

| | | |
|---|---|---|
| EP | 1701004 A1 | 9/2006 |
| EP | 1880793 A2 | 1/2008 |
| EP | 2014413 A1 | 1/2009 |
| EP | 2028342 A2 | 2/2009 |
| EP | 2586562 A2 | 5/2013 |
| GB | 2453945 A | 4/2000 |
| JP | 2004188451 A | 7/2004 |
| WO | 9208592 A1 | 5/1992 |
| WO | 0000921 A1 | 1/2000 |

OTHER PUBLICATIONS

Song et al., "Control of Melt Pool Temperature and Deposition Height During Direct Metal Deposition Process," International Journal of Advanced Manufacturing Technology, vol. 58, May 27, 2011, pp. 247-256.

Tang et al., "Melt Pool Temperature Control for Laser Metal Deposition Processes—Part 1: Online Temperature Control, Journal of Manufacturing Science and Engineering", vol. 132, Feb. 2010, pp. 011010-1 to 011010-9.

Tang et al. "Variable Powder Flow Rate Control in Laser Metal Deposition Processes", University of Missouri-Rolla, Aug. 21, 2007, pp. 22-48.

(56) References Cited

OTHER PUBLICATIONS

"LightSPEE3D 3D Metal Printer," accessed from https://www.spee3d.com/product/lightspee3d/, accessed on Dec. 13, 2021, 4 pp.
Yin et al., "Cold Spray Additive Manufacturing and Repair: Fundamentals and Applications," Additive Manufacturing, vol. 21, May 2018, pp. 628-650.
U.S. Appl. No. 17/551,480, filed Dec. 15, 2021, by Shuck et al.

BLADED DISK REPAIR PROCESS WITH SHIELD

This application claims the benefit of U.S. Provisional Patent Application No. 63/117,750, filed Nov. 24, 2020, the entire content of which is incorporated herein by reference.

TECHNICAL FIELD

The present disclosure generally relates to techniques for repairing a bladed disk using, e.g., an additive manufacturing process.

BACKGROUND

Integrally bladed disks, which may be called blisks, are used in low-pressure compressor (LPC) and high-pressure compressor (HPC) stages of gas turbine engines. The blisks may weigh less and have lower leakage than separate blades and disks, facilitating gas turbine engine efficiency. In some examples, multiple blisks may be metallurgically bonded or welded together to make blisk drums. Although this may further reduce component weight compared to separate blisks mechanically attached to each other, it increases manufacturing and repair costs.

SUMMARY

In some examples, the disclosure describes a method that includes positioning a shield member around a perimeter of a partial blade extending from a rotor disk of a bladed disk, the shield member being positioned adjacent to a build surface of the partial blade; and depositing, with the shield member around the perimeter of the partial blade, a material on the build surface using an additive manufacturing technique to form a repaired portion on the build surface of the partial blade.

In some examples, the disclosure described a system including a bladed disk including a plurality of blades extending from a rotor disk, wherein at least one of the plurality of blades includes a partial blade portion; and a shield member configured to be positioned around a perimeter of a partial blade extending from the rotor disk of a bladed disk, the shield member being configured to be positioned adjacent to a build surface of the partial blade.

The details of one or more examples are set forth in the accompanying drawings and the description below. Other features, objects, and advantages will be apparent from the description and drawings, and from the claims.

DETAILED DESCRIPTION

Figure 1:
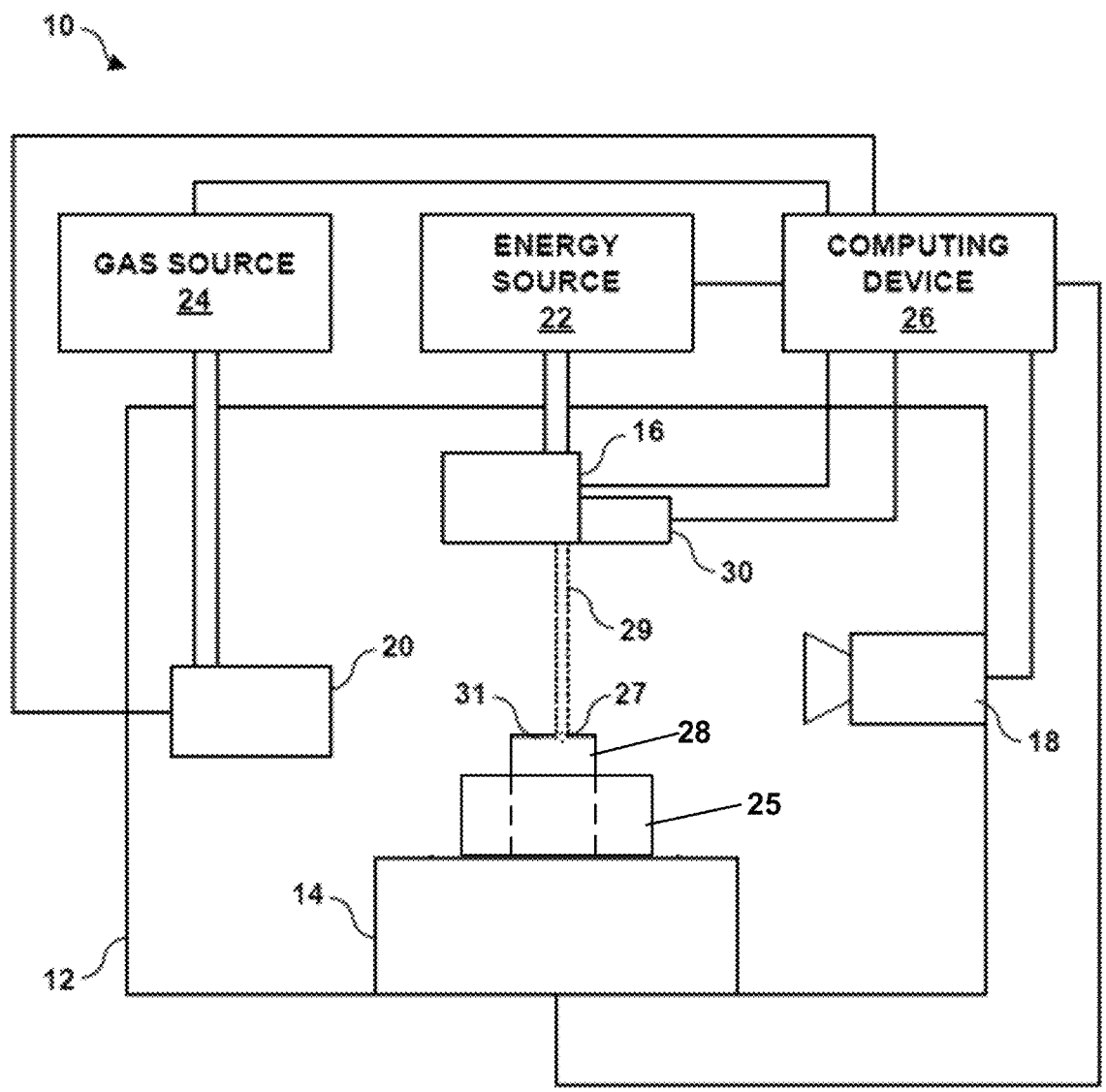
FIG. 1 is a conceptual block diagram illustrating an example system for forming a component and/or repairing a damaged component using a directed energy deposition additive manufacturing process.

The disclosure describes systems and techniques for repairing one or more damaged blades on a bladed disk (referred to as a blisk). In some examples, directed energy deposition (DED) or other suitable additive manufacturing techniques may be used to deposit at least one layer of material on a build surface of a partial blade to repair a damaged portion of the blade on the blisk. Repair of a bladed disk through directed energy deposition may require the removal of the damaged blades (e.g., by machining or otherwise mechanically cutting out the damage portion) to produce a partial blade and then replacing the removed portion by programmatically moving over the surface with an intersecting laser and metallic powder stream that is melted in a melt pool on the build surface of the partial blade. This process can effectively produce a near-net shape repaired blade with base material properties. However, since the laser is melting metal to form a new blade, the energetic process may cause spatter of material from the melt pool. This spatter may be generated through molten material ejection from the melt pool or agglomeration of semi-molten powder particulates. This spatter remains molten/semi-molten until it contacts a cold surface such as the other portions of the blisk (e.g., the annulus between blades, blade filets, and intact blades) on both the repaired and neighboring stages (e.g., in the case of compressor blisks).

In some examples, a polymer-based ceramic tape may be used to mask adjacent blades of the blisk near the blade being repaired. However, the use of a polymer-based ceramic tape has been found to be inadequate as the temperature of the spatter, errant laser strikes, and the radiative heat of the blisk lead exceed the char temperature of the polymer-based ceramic tape.

In accordance with examples, the disclosure a shield member may employed during a DED process or other additive manufacturing (AM) process to repair a blade. For example, during the AM process for repairing a blade, a shielding member may be located around at least a portion of the perimeter of the partial blade (e.g., the portion of a blade that is attached to the rotor disk that remains after the damaged portion has been removed) defining the build surface. The shielding member may be configured to physically shield non-repaired areas of the blisk, such as, portions of the partial blade adjacent the build surface, surfaces of neighboring blades and/or other portions of the blisk such as the annulus between blades or blade filets from material spatter from the additive manufacturing process. The shielding member may physically shield such portions of the blisk by covering or otherwise providing a physical barrier that prevent spatter from the DED process used to build the blade being repaired from being deposited (e.g., by splatter) on the surface of the shielded portion. Instead, the splatter may be deposited on the surface of the shield member which may be removed once the DED process is complete.

In some examples, the shield member includes a substrate including one or more apertures into the substrate. For a single blade being repaired, the shield member may be a substrate with a single aperture, where the partial blade defining the build surface during the repair is configured to be positioned within the aperture during the DED process. In some examples, the partial blade may extend through the aperture so that the build surface of the partial blade is above the surface plane of the shield member. In some examples, the shield member includes a chamfer around the area where the partial blade protrudes from the aperture through the upper surface of the shield member, e.g., to prevent the joining of the shield member and the blade through unintentional welding, e.g., due to the heat transferred to the shield member and/or partial blade during the DED process. For example, the aperture in the substrate of the shield member may be tapered such that a gap between the shield member and partial blade is reduced when moving in a direction away from the build surface of the partial blade.

In some examples, the shielding member may be formed of a material that is chemically compatible with the composition of the blade being repaired, e.g., in addition to the neighboring blades and rotor of the blisk. In some examples, the shield member may be formed of material that has relatively high thermal conductivity such as aluminum, copper, or some combination thereof. Additionally, or alternatively, the shield member may be formed of the base material used for the blisk being repaired (e.g., titanium alloys such as Ti-6-2-4-2, Ti-6-2-4-6, and Ti-6-4; and/or nickel alloy such as: IN718, RR1000, and IN792). In some examples, the shield member may be formed of, or otherwise include, a ceramic (such as Alumina—Al2O3 or Boron Nitride—BN), or other chemically inert barrier layers to prevent interdiffusion and contamination of the blisk.

In some examples, the entire shield member has substantially the same composition while in other examples, the shield member may have discrete sections having different compositions. For example, a shield member may be formed of a ceramic material in the portion of the shield that interfaces with the partial blade being repaired or other portions of the blisk, with all or some of the remaining portions being formed of a material with high thermal conductivity, e.g., to transfer heat away from the surface of the shield member so that splatter cools rapidly on the surface of the shield member and the temperature of the blisk does not increase above a desired level.

In some examples, the shielding member may be configured to remove heat from the partial blade (and/or the surfaces of neighboring blades and rotor of the blisk) resulting from the additive manufacturing technique by conducting heat away from the partial blade. For example, as described herein, all or portions of the shield member may be formed of a material such as copper or aluminum with a relatively high thermal conductivity. The shield member may have a sufficient volume so that the shield member may act as a heat sink for the heat transferred into the shield member. As another example, the shield member may have one or more cooling passageways for a cooling fluid to be transferred through during a DED or other AM process. For example, the shielding member may include internal cooling passages for the flow of argon, water, air or inert gas or other liquid or gas coolant, e.g., to ensure that the shielding member remains below its melting temperature and to capture "splatter" particles through freezing on the surface of the shield member to prevent any secondary ricochets. The cooling fluid may be actively pumped through the passageway(s) or may flow through the passageways using gas pressure (e.g., in the case of a compressed gas for the cooling fluid).

In some examples, the shield member may be formed of two or more portions that may be assembled around a partial blade to act as a shield during a DED process to repair the partial blade by depositing layers of material on the build surface of the partial blade. For example, the shield member may include first and second portions split about the one or more apertures formed in the shield member substrate. The first and second portions may be configured to allow the shield member to be assembled around the partial blade in "clam-shell" arrangement and subsequently disassembled from around the blade after the repair is complete.

In some examples, the shield member may be configured to surround the perimeter of one or more blades on the blisk not being repaired in addition to one or more partial blades being repaired. For example, a shield member may be arranged around the perimeter of one or more blades directly adjacent to a blade being repaired, e.g., with the shield member also being arranged around the partial blade being repaired. In such an example, the shield member may include multiple apertures in the shield substrate, with each aperture being configured to be positioned around a respective blade or partial blade of the blisk. The shield member may extend radially or about the radius of the blisk to some degree to protect neighboring blades or stages. In some examples, multiple shield members may be used during a DED process to repair one or more partial blades, e.g., rather than a single unitary shield member. Each of the multiple shields may include one or more apertures, with each aperture being configured to be positioned around a blade that is being repaired or a blade that is not being repaired, e.g., an undamaged blade next to a partial blade.

For ease of description, examples of the disclosure are primarily described with regard to a DED process for replacing the damaged portion of a blade. The DED process may include hybrid DED including additive and subtractive steps, wire arc additively manufacturing (WAAM), laser blown powder electron beam—directed energy deposition, and the like. However, other suitable AM techniques are contemplated.

FIG. 1 is a conceptual diagram illustrating an example system 10 for repairing one or more damaged blade of blisk 28 using a DED process. While system 10 and the techniques described herein are primarily described with regard to repairing a damaged blade of blisk 28, such systems and techniques may be used to form a blade of blisk 25 regardless of whether or not the blade being formed is replacing a blade that has been damaged. In some examples, the systems and techniques of the disclosure may be employed to form a blade for a blisk, where the blade being formed is not replacing a blade that was previously damaged but instead replacing the blade for another reason or even forming an original blade of blisk 28.

The example system 10 illustrated in FIG. 1 includes an enclosure 12, which encloses a stage 14, an energy delivery head 16, at least one sensor 18, a gas delivery device 20, and a material delivery device 30. System 10 also includes an energy source 22, which is operatively coupled to energy delivery head 16 and a gas source 24, which is fluidly connected to gas delivery device 20. In the example of FIG. 1, system 10 further includes a computing device 26, which is communicatively connected to energy source 22, gas source 24, gas delivery device 20, energy delivery head 16, at least one sensor 18, stage 14, and material delivery device 30.

As will be described herein, blisk 28 includes blades extending from a central rotor disk of blisk 28. In some examples, blisk 28 may be used in a gas turbine engine. For example, blisk 28 may be used for a compressor blade, fan blade, or other bladed component of a gas turbine engine.

Figure 2:
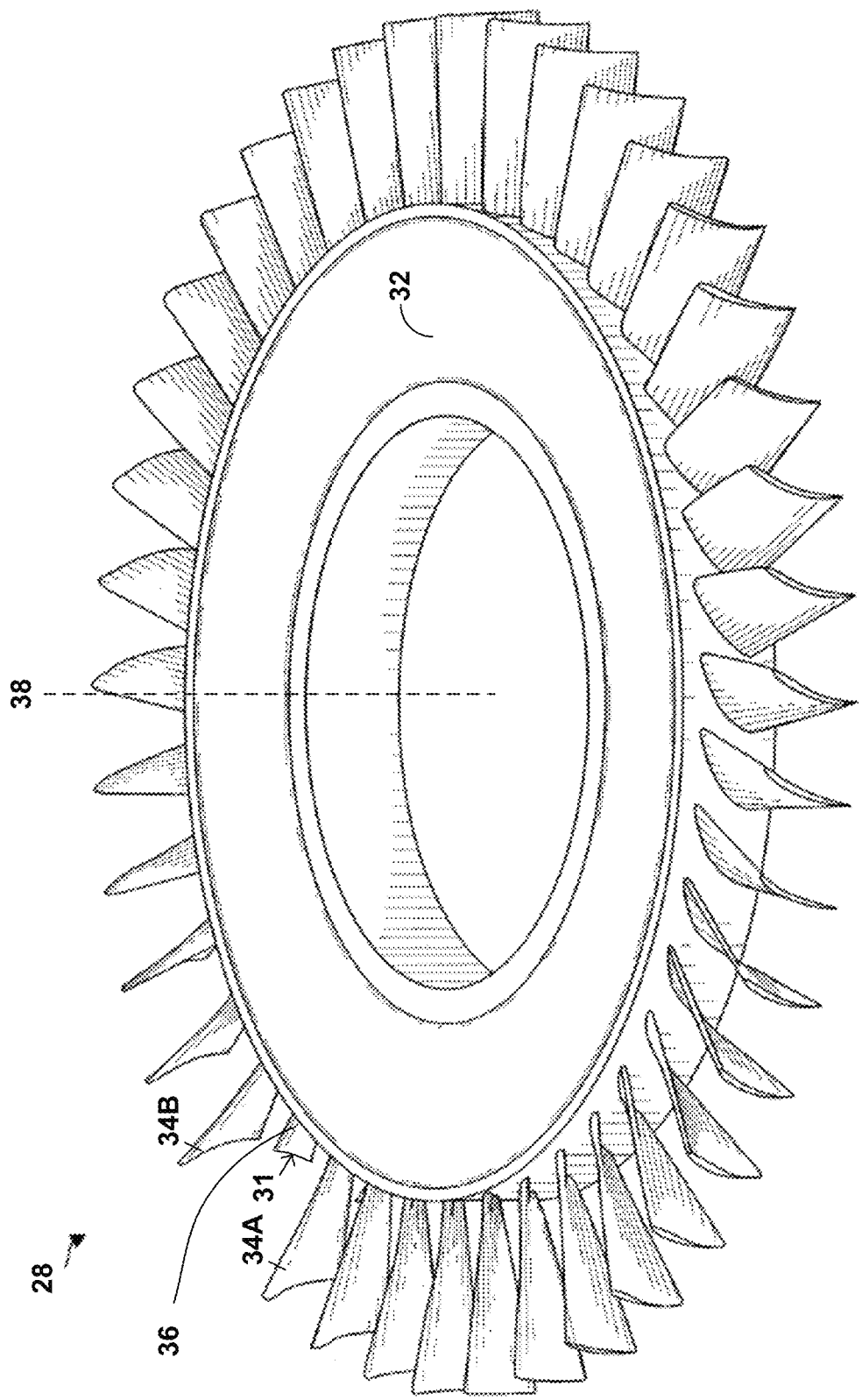
FIG. 2 is a conceptual diagram illustrating an example gas turbine blisk including an example partial blade.

FIG. 2 is a conceptual diagram illustrating an example blisk 28. As shown, blisk 28 includes a plurality of blades (such as blades 34A and 34B) extending a radial direction from rotor disk 32. The blades of blisk 28 are evenly dispersed around the outer circumference of rotor disk 32 and are separated by spaces at the outer surface of rotor disk 32. During operation, rotor disk 32 may rotate about its central axis 38.

As shown in FIG. 2, blade 36 may define only a partial blade. For example, blade 36 may have been damaged during operation of blisk 28 in a gas turbine engine, e.g., by a bird strike or impact by another foreign object. Prior to the damage, partial blade 36 may have had substantially the same size and shape of neighboring blades 34A and 34B. In the illustration of FIG. 2, partial blade 36 is shorter than blades 34A and 34B, which may be a result of a portion of a larger blade being removed as a result of the damage or mechanical removal of a portion of the blade that included damage. As will be described below, a surface of blade 36 may define a build surface 31 of blisk 28 onto which material is added, e.g., in layers, by system 10 to reform a portion of the blade so that blade returns to the size and shape of the other blades on rotor disk 32 such as blades 34A and 34B.

Blisk 28 may be formed of materials including metals and alloys, alone, or with one or more metallic, alloy, or ceramic coatings. In some examples, blisk 28 may include a titanium alloy or a nickel alloy. Example alloys include Ti-6Al-4V, Ti-6Al-2Sn-4Zr-2Mo, Ti-6Al-2Sn-4Zn-6Mo, and Inconel 718, an alloy including about (by mass) 50-55% Ni, about 17-21% Cr, about 2.8-3.3% Mo, about 4.75-5.5% Nb, about 1% Co, about 0.35% Mn, about 0.2-0.8% Cu, about 0.65-1.15% Al, about 0.3% Ti, about 0.35% Si, about 0.08% C, about 0.015% S, about 0.015% P, about 0.006% B, and a balance Fe.

Returning to FIG. 1, enclosure 12 may substantially enclose (e.g., enclose or nearly enclose) stage 14, energy delivery head 16, at least one sensor 18, gas delivery device 20, blisk 28, and material delivery device 30. In some examples, enclosure 12 may contain a substantially inert atmosphere (e.g., helium, argon, or the like) during operation of system 10.

In some examples, stage 14 may be configured to selectively position and restrain blisk 28 in place relative to stage 14 during the formation of a portion of partial blade 38 of blisk 28, e.g., to repair partial blade 38. In some examples, stage 14 is movable relative to energy delivery head 16, gas delivery device 20, at least one sensor 18, and/or material delivery device 30. For example, stage 14 may be translatable and/or rotatable along at least one axis (e.g., using a 5-axis motion system) to position blisk 28 relative to energy delivery head 16, gas delivery device 20, and/or at least one sensor 18. Similarly, in some examples, at least one of energy delivery head 16, gas delivery device 20, and/or at least one sensor 18 may be movable relative to stage 14 to position the at least one of energy delivery head 16, gas delivery device 20, and/or at least one sensor 18 relative to blisk 28. In some examples, as illustrated in FIG. 1, energy delivery head 16 may be coupled (e.g., mechanically attached) to material delivery device 30, such that positioning energy delivery head 16 relative to stage 14 also positions material delivery device 30 relative to stage 14.

Energy source 22 may include, for example, a laser source, such as a CO laser, a $CO_2$ laser, a Nd:YAG laser, or the like. Energy source 22 may be selected to provide energy with a predetermined wavelength or wavelength spectrum that may be absorbed by the material to be added to partial blade 36 of blisk 28 during the DED process or repair or otherwise form a substantially whole blade from partial blade 36 of blisk 28. Energy source 22 may be operatively connected to energy delivery head 16, which aims an energy beam 29 toward build surface 31 of partial blade 36 of blisk 28 during formation or repair of partial blade 36 of blisk 28. As described above, in some examples, energy delivery head 16 may be movable in at least one dimension (e.g., translatable and/or rotatable) under control of computing device 26 to direct the focal spot 27 of energy beam 29 toward a selected location of portion of blisk 28 having partial blade 36. In some examples, the movement of energy delivery head 16 and/or stage 14 may also control the angle of energy beam 18 relative to build surface 31 on partial blade 36.

In some examples, energy delivery head 16 may define a relatively small size in at least one dimension. In some examples, blisk 28 may be relatively small and/or may define a complex shape with relatively small spacing between adjacent structures. For example, a gas turbine blisk may include a plurality of blades with a spacing of less than 1.0 inch (2.54 cm). Hence, in some examples, the energy delivery head 16 may be sufficiently small to allow head 16 to be positioned to direct focal spot 27 toward portions of a blisk 28 that is small or that has structural features that result in small working spaces between the structural features.

Computing device 26 may control at least one of the power level of energy source 22, the focal spot size of the energy beam delivered adjacent to build surface 31 of blisk 28 defined by partial blade 36, the relative movement of the focal spot 27 of the energy beam 29 relative to blisk 28, a pause time between bursts of energy, the standoff between the focal point and build surface 31 of blisk 28, the angle of energy beam 18 relative to build surface 31, or tool path. The tool path may include the width of the overlap between adjacent passes of the energy beam focal spot and the build-up rate. Computing device 26 may control the at least one of these parameters to control the amount of material added to blisk 28 at a given time and/or to control metallurgical properties of the added material. In some examples, energy delivery head 16 may be scanned (e.g., translated) relative to build surface 31 of blisk 28 being repaired to scan the focal spot relative to build surface 31 of blisk 28 being repaired, and the material may be fused in a general shape corresponding to the scanned path of the focal spot.

System 10 also includes gas source 24. Gas source 24 may include, for example, a source of helium, argon, or other substantially inert gas. In some examples, the gas may function as a cooling gas, which cools a portion of blisk 28 by flowing past the portion of blisk 28. As used herein, a substantially inert gas may include a gas that does not react with blisk 28 or the material being added to blisk 28 during the DED MA forming or repair process. Gas source 24 is fluidically coupled to gas delivery device 20. Although FIG. 1 illustrates system 10 including a single gas delivery device 20, in other examples, system 10 may include at least one gas delivery device 20, such as a plurality of gas delivery devices. Gas source 24 may be fluidically coupled to gas delivery device 20 using a tube, pipe, conduit, or the like, that allows fluid communication between gas source 24 and gas delivery device 20.

As described above, in some examples, gas delivery device 20 may be movable relative to blisk 28 under control of computing device 26. This may allow computing device 26 to control delivery of gas to a selected portion of blisk 28 to achieve controlled cooling of the selected portion of blisk 28. In examples in which system 10 includes a plurality of gas delivery device 20, each outlet 20 may be independently controllable by computing device 26 to independently cool selected portions of blisk 28.

In some examples, system 10 also may include a material delivery device 30. Material delivery device 30 may be configured to deliver material to the location of blisk 28 being formed or repaired. The material then may be heated by energy delivered by energy delivery head 16 to add the material to blisk 28. In some examples, energy delivery head 16 may form a melt pool on build surface 31, and the material from material delivery device 30 is delivered to the melt pool such that the material is melted by the melt pool on build surface 31. In some examples, the material may be supplied by material delivery device 30 in powder form or wire form. In some examples, the material to be delivered to material delivery device 30 may include a composition substantially the same as (e.g., the same or nearly the same as) the composition of the material from which blisk 28 and/or partial blade 36 is formed. In other examples, the material to be delivered to material delivery device 30 may include a composition different from the composition of the material from which blisk 28 and/or partial blade 30 is formed.

As illustrated in FIG. 1, in some examples, material delivery device 30 may be mechanically attached to or integrated into energy delivery head 16. In some examples, this may facilitate coordinated positioning of energy delivery head 16 relative to the location at which material is delivered. In other examples, material delivery device 30 may be separate from energy delivery head 16.

In some examples, material delivery device 30 may deliver the material in powder form, wire form, or the like. For example, material in powder form may be blown by material delivery device 30 to deliver the material adjacent to build surface 31. Initially, material delivery device 30 may be positioned and configured to deliver material adjacent to build surface 31. Computing device 26 also may control the rate at which material is delivered by material delivery device 30 adjacent to blisk 28. As described above, the material may be delivered to a melt pool formed on build surface 31, where the material then melts and subsequently solidifies to form an additive layer of material. The process may be repeated to form multiple layers of material which form a repaired portion of partial blade 36.

At least one sensor 18 may be configured to detect at least one parameter indicative of the status of blisk 28 during formation or repair of partial blade 36 of blisk 28. For example, at least one sensor 18 may monitor a characteristic of a melt pool formed during addition of the material to blisk 28, a geometry of blisk 28, or the like. The at least one sensor 18 may include, for example, a visual or thermal imaging system, a laser, sonar, probe, or the like.

In some examples, at least one sensor 18 may include a sensor for monitoring a characteristic of a melt pool formed during addition of the material to blisk 28. The sensor may include an imaging system, such as a visual or thermal camera, e.g., camera to visible light or infrared (IR) radiation. A visible light camera may monitor the geometry of the melt pool, e.g., a width, diameter, shape, or the like. A thermal (or IR) camera may be used to detect the size, temperature, or both of the melt pool. In some examples, a thermal camera may be used to detect the temperature of the melt pool at multiple positions within the melt pool, such as a leading edge, a center, and a trailing edge of the melt pool. In some examples, the imaging system may include a relatively high-speed camera capable of capturing image data at a rate of tens or hundreds of frames per second or more, which may facilitate real-time detection of the characteristic of the melt pool.

As another example, at least one sensor 18 may include a sensor for monitoring a geometry of blisk 28. The sensor for monitoring the geometry of blisk 28 may include, for example, a visual camera, such as a high-resolution vision system and/or a laser vision sensor, a sonar, a physical probe, or the like. The sensor may monitor at least one aspect of the geometry of blisk 28, including a geometry of a surface feature of blisk 28, a layer geometry of a layer being added to blisk 28, a distortion of the geometry of blisk 28 compared to a predicted or reference geometry, or the like. For example, the layer geometry may indicate overbuild (excess material added to the component compared to what is expected), underbuild (insufficient material added to the component compared to what is expected), or a correct amount of build. In some examples, the sensor for monitoring the geometry of blisk 28 may include a relatively high-speed camera capable of capturing image data at a rate of tens or hundreds of frames per second or more, which may facilitate real-time detection of the geometry of blisk 28 during formation or repair of blisk 28.

Computing device 26 may include, for example, a desktop computer, a laptop computer, a workstation, a server, a mainframe, a cloud computing system, or the like. Computing device 26 may include or may be one or more processors including processing circuitry, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "processing circuitry" as used herein may refer to any of the foregoing structure or any other structure suitable for implementation of the techniques described herein. In addition, in some aspects, the functionality of computing device 26 may be provided within dedicated hardware and/or software modules.

Computing device 26 is configured to control operation of system 10, including, for example, stage 14, at least one sensor 18, gas delivery device 20, gas source 24, energy source 22, energy delivery head 16, and/or material delivery device 30. Computing device 26 may be communicatively coupled to at least one of stage 14, at least one sensor 18, gas delivery device 20, gas source 24, energy source 22, energy delivery head 16, and/or material delivery device 30 using respective communication connections. In some examples, the communication connections may include network links, such as Ethernet, ATM, or other network connections. Such connections may be wireless and/or wired connections. In other examples, the communication connections may include other types of device connections, such as USB, IEEE 1394, or the like.

Computing device 26 may be configured to control operation of stage 14, at least one sensor 18, energy delivery head 16, and/or gas delivery device 20 to position blisk 28 relative to at least one sensor 18, energy delivery head 16, and/or gas delivery device 20. For example, as described above, computing device 26 may control stage 14 at least one sensor 18, energy delivery head 16, and/or gas delivery device 20 to translate and/or rotate along at least one axis to position blisk 28 relative to at least one sensor 18, energy delivery head 16, and/or gas delivery device 20. Positioning blisk 28 relative to at least one sensor 18, energy delivery head 16, and/or gas delivery device 20 may include positioning a predetermined surface (e.g., a surface to which material is to be added) of blisk 28 in a predetermined orientation relative to at least one sensor 18, energy delivery head 16, and/or gas delivery device 20.

As conceptually represented in FIG. 1, shield member 25 may be positioned adjacent to a portion of blisk 28 during the deposition of material by system 10 using a DED process, as described herein. The DED process may be used to repair partial blade 36 of blisk by building up the deposited material on build surface 31 in the manner described to re-form the portion of partial blade 36 that was damaged or otherwise previously removed. In some examples, the repaired blade may be formed by system 10 to be at or near net shape, or additional processing steps after the DED process may be required, such as machining to form the desired shape of the repaired blade. Shield member 25 may be positioned around a portion of partial blade 36 adjacent to build surface 31, e.g., to function in the manner described herein during the DED process to rebuild partial blade 36.

Figure 3:
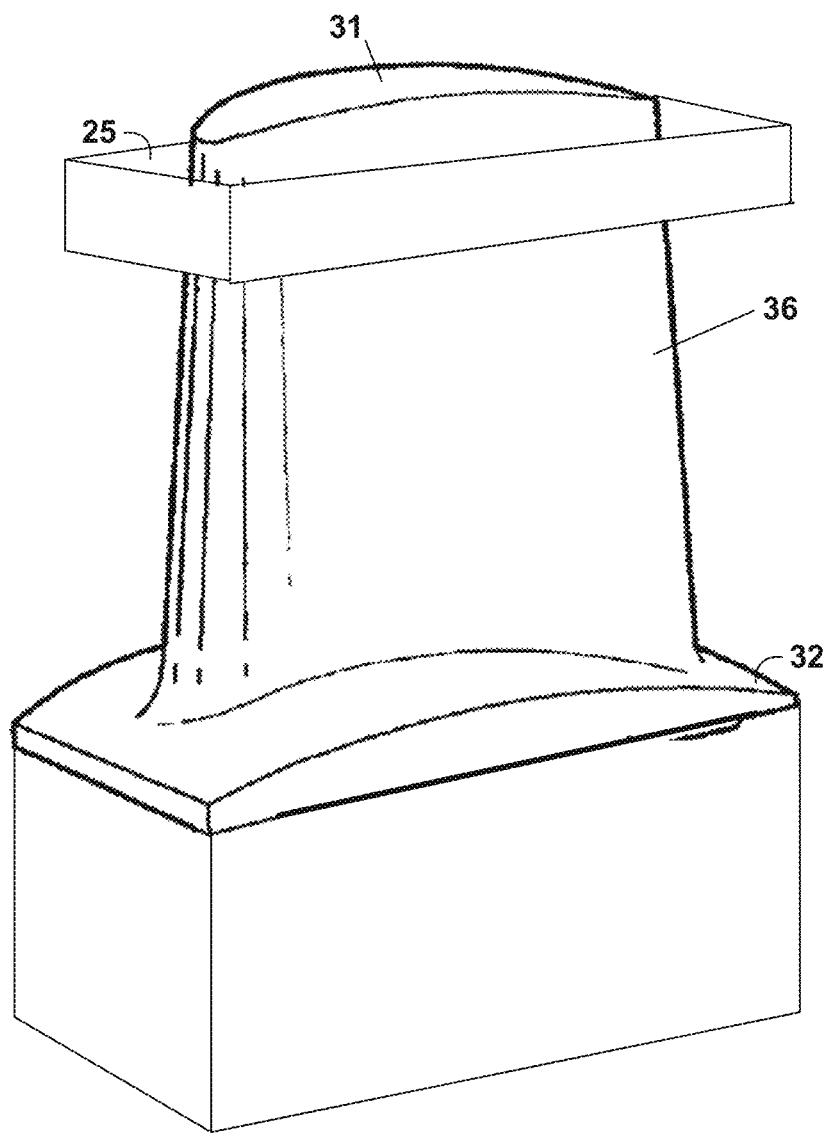
FIG. 3 is a conceptual diagram illustrating the example partial blade of FIG. 2 including an example shield member positioned around the partial blade.
Figure 4:
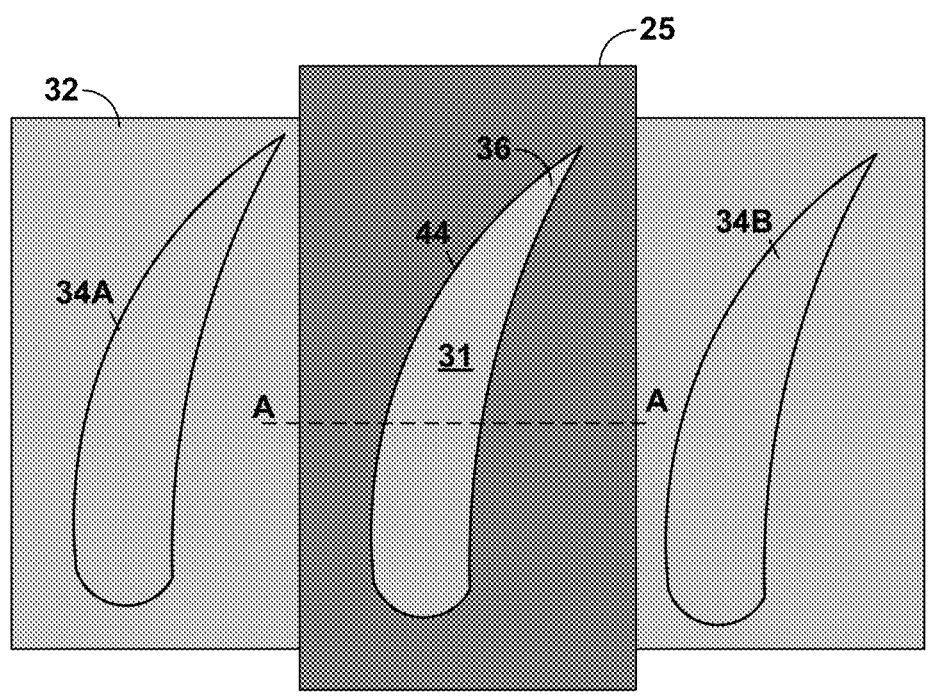
FIGS. 4 and 5 are conceptual diagrams illustrating an example shield member positioned around a partial blade.
Figure 5:
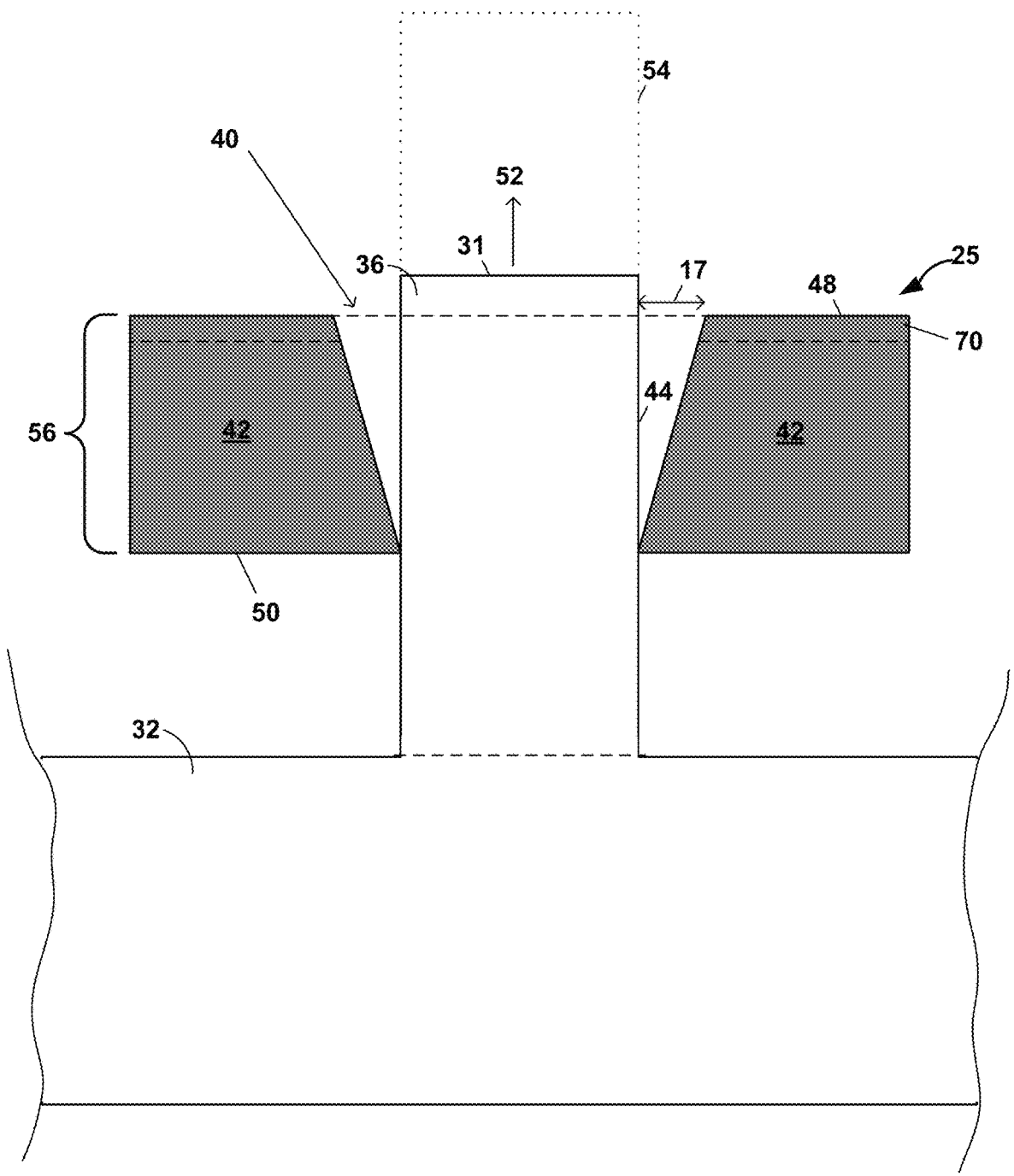
Figure 6A:
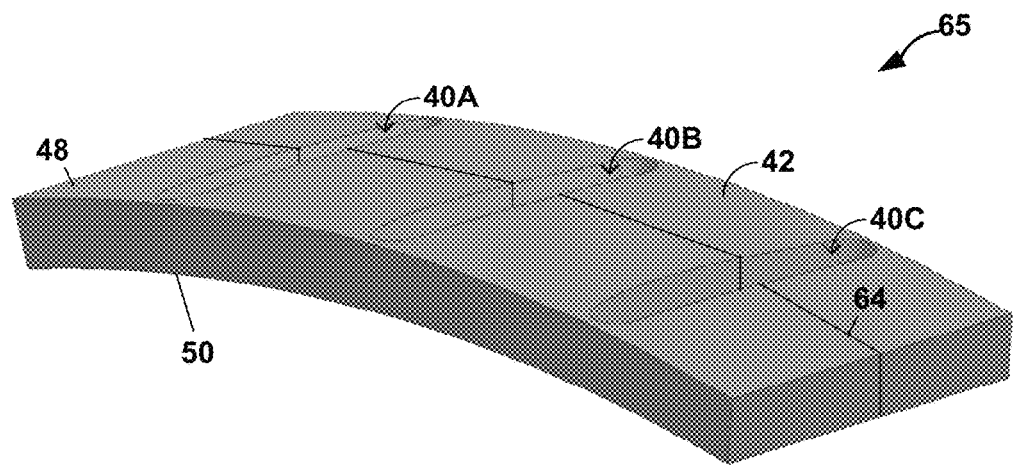
FIGS. 6A and 6B are conceptual diagrams illustrating another example shield member.
Figure 6B:
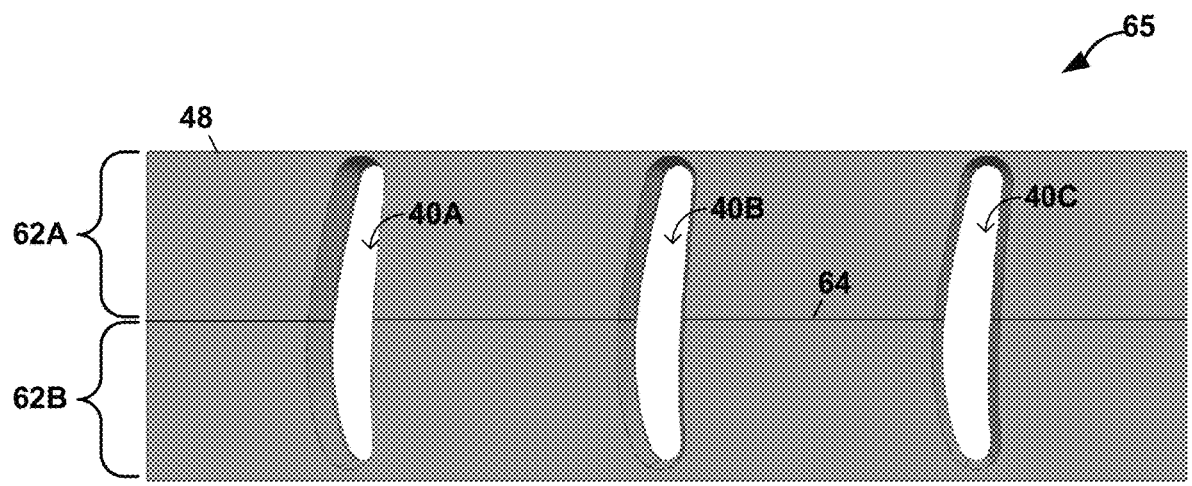
Figure 7:
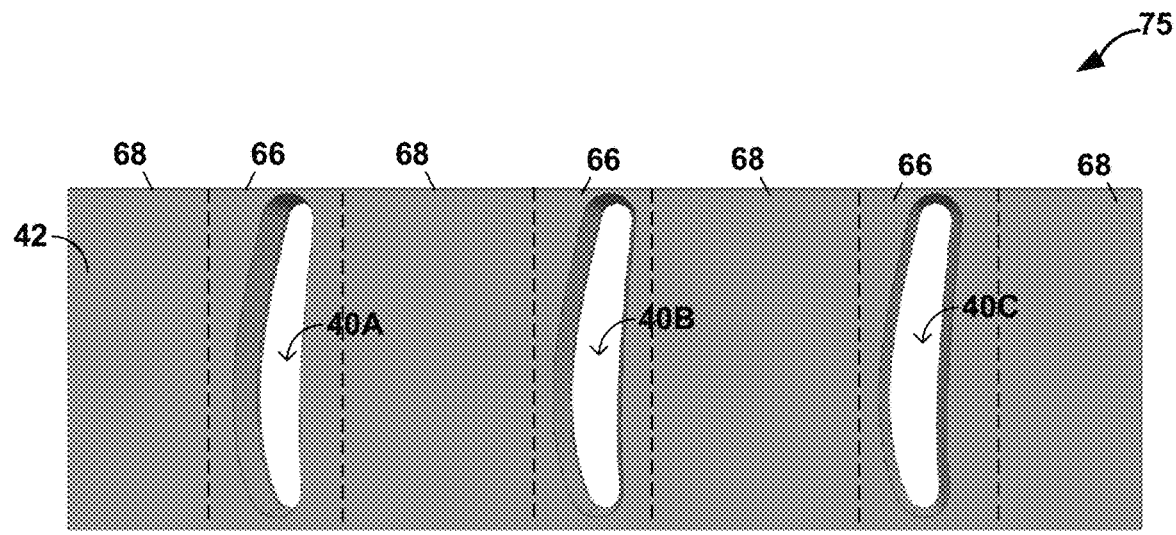
FIG. 7 is a conceptual diagram illustrating another example shield member.

FIGS. 3-5 are conceptual diagrams illustrating the portion of blisk 28 shown in FIG. 2 that includes partial blade 31 extending radially from blisk rotor 32. In FIGS. 3-5, shield member 25 is also shown positioned around the perimeter 44 of partial blisk 36. FIG. 4 is a plan view also showing neighboring blades 34A and 34B, which also extend from blisk rotor 32. FIG. 5 is a view of partial blisk 36 prior to being repaired shown along cross-section A-A in FIG. 4. While the example shield member 25 in FIGS. 3-5 is configured to be positioned around a single blade or partial blade, in other examples, shield member 25 may be configured to be positioned around multiple blades and/or partial blades, e.g., as shown in the example of FIGS. 6A, 6B, and 7.

As shown, shield member 25 may include shield substrate 42 having aperture 40. Aperture 40 may be sized and shaped such that partial blisk 36 extends through aperture 40 in shield substrate 42 when shield member 25 is positioned around perimeter 44. Shield member 25 may physically shield portions of partial blisk 36 and/or additional portions of blisk 28 during the DED process performed by system 10 while leaving build surface 31 of partial blisk 31 exposed to energy beam 29 to allow for material from material delivery device 30 to be delivered to, e.g., a melt pool formed on build surface 31. In some examples, when shield member 25 is positioned around partial blade 36, the plane of the top surface 48 of shield substrate 42 is below the plane of build surface 31. In other examples, build surface 31 may be substantially even with the surface plane of top surface 48 of shield substrate 42 or build surface 31 may be recessed into aperture 40 of shield substrate 42 so that build surface 31 is below the surface plane of top surface 48 of shield substrate 42. During the DED process, material may be deposited on build surface 31 of partial blade 36 to build partial blade 25 in build direction 52, e.g., to form repaired blade portion 54 (indicated by the dashed line in FIG. 5). When repaired blade portion 54 is formed via the DED process (as well as other optional steps such as machining), the combination of repaired blade portion 54 and partial blade 36 may form a repaired blade (e.g., a blade having a geometry that is the same as neighboring blades 34A and 34B).

In some examples, aperture 40 may be configured such that partial blade 36 may be inserted through aperture 40 to position shield member 25 around perimeter 44 of partial blade 36 as desired. Additionally, or alternatively, shield substrate 42 may be formed of two or more pieces that may be assembled around perimeter 44 of partial blade 36 as desired. For example, shield member 25 may be formed two pieces that may be assembled around partial blade 36 in a clam shell configuration, such as described below with regard to the examples shown in FIGS. 6A and 6B. The pieces of shield member 25 may be assembled and temporarily attached to each other so that shield member 25 is positioned around partial blade 36 during a DED process to repair partial blade 36 in the manner described herein. After the process, shield member 25 may be disassembled or otherwise removed from the position around partial blade 36.

As shown in FIG. 5, in some examples, aperture 40 in shield substrate 42 may be chamfered around top surface 48, e.g., such that gap 17 exists between partial blade 36 and shield substrate 42 at top surface 48. Aperture 40 may taper from top surface 48 to bottom surface 50 of shield substrate 42 in some examples as shown in FIG. 5. In some examples, shield substrate 42 may be in contact with partial blade 36 at a portion of perimeter 44, e.g., at or near bottom surface 50 of shield substrate 42, while in other portions a space such as gap 17 may be present. In some examples, gap 17 between shield substrate 42 and partial blade 36 prevent or reduce the welding of shield substrate 42 to partial blade 36 during the DED process, e.g., due to heating of partial blade 36 near build surface 31, and/or attachment of shield substrate 42 to partial blade 36 from splatter of material from build surface 31. In some examples, gap 17 may be at least about 0.5 millimeters, or at least about 1 millimeter, such about 0.5 millimeters to about 3 millimeters. Other values are contemplated.

Shield member 25 may be configured to transfer heat away from partial blade 36 during the DED process and/or provide a surface onto which splatter or other material from material delivery device 30 that does not remain on build surface 31 to cool and solidify rather than be directed to other surfaces of blisk 28. In some examples, shield substrate 42 may be formed of a material that has relatively high thermal conductivity. This may allow heat to be transferred away from partial blade 36 that results from the DED process, e.g., resulting from the application of energy from energy beam 29. This may prevent unintentional welding of shield substrate 42 to partial blade 36, or undesired heating of partial blade 36. In some examples, the mass of shield substrate 42 functions as a heat sink for heat generated from the DED process and transferred into shield substrate 42. Additionally, or alternatively, the relatively high thermal conductivity of shield substrate 42 may allow for the rapid cooling of material splattered onto a surface of shield substrate 42 to solidify the material rather that allow the material to remain molten and prevent secondary ricochets of the material onto other portions of blisk 28.

In some examples, all or a portion of shield substrate 42 may be formed of (e.g., comprise, consist, or consist essentially of) aluminum, copper, or other relatively high thermally conductive material (e.g., with a thermal conductivity of at least about 100 W/mK), and/or the base material for partial blade 36 and/or other portions of blisk 28. Example materials may include titanium alloys such as Ti-6Al-2Sn-4Zr-2Mo, Ti-6Al-2Sn-4Zn-6Mo, and Ti-6Al-4V, or nickel alloys such as Inconel 718, RR1000, and Inconel 792. In some examples, all or a portion of shield substrate 42 may be formed of (e.g., comprise, consist, or consist essentially of) a ceramic such as alumina ($Al_2O_3$) or boron nitride (BN) or other chemically inert material (e.g., as a barrier layer that defines a surface portion of substrate 42) to prevent inter-diffusion and/or contamination of the blisk. In some examples, all or a portion of substrate 42 may be formed of a material that is chemically compatible with the composition of partial blade 36 and/or the composition of the material being deposited on build surface 31 using the DED process. For example, the material may be non-reactive with the blisk/blade material or the same material as the blisk/blade material.

In some examples, shield substrate 42 has a substantially uniform composition throughout while in other examples the composition of shield substrate 42 may vary, e.g., with different discrete portions having different compositions such as the example described with regard to FIG. 7 below. As one example, portions of shield substrate 42 that interface with partial blade 36 such as the walls of aperture 40 may be formed of a ceramic material while top surface 48 may be formed of a material that has relatively high thermally conductivity.

Shield substrate 42 may have any suitable thickness 56 from top surface 48 to bottom surface 50. Thickness 56 may be selected such that the shield member 25 functions in the manner described herein. In some examples, thickness 56 may be selected such that there is an adequate volume of shield substrate 42 for substrate 42 to function as a heat sink during a DED process, e.g., to maintain partial blade 36 below a particular threshold temperature. In some examples, thickness 56 may be selected such that there is an adequate volume of shield substrate 42 for substrate 42 to allow for heat to be transferred away from top surface 48 or other surface of substrate 42 so that spatter or other molten material from the DED process applied to build surface cools and solidifies on the surface, e.g., rather than ricocheting onto another surface of blisk 28. In some examples, thickness 56 may be at least about 5 millimeters such as about 5 millimeters to about 15 millimeters. Other values are contemplated.

The example shield member 25 in FIGS. 3-5 includes a single aperture 40 in shield substrate 42 so that shield member 25 may be positioned around a single partial blade 36. As shown in FIG. 4, shield member 25 may be situated between neighboring blades 34A and 34B when positioned around partial blade 36. In other examples, shield member 25 may include multiple apertures (e.g., 2 to 20 apertures or 3 to 5 apertures) so that shield member 25 may be positioned around multiple blades (including one or more partial blades being repaired by a DED process and/or one or more other blades such as neighboring blades 34A and 34B that are not being repaired by the DED process.

FIGS. 6A and 6B are conceptual diagrams illustrating another example shield member 65. Shield member 65 may be substantially similar to examples of shield member 25 described herein and like features are similarly numbered. However, unlike shield member 25, shield member 65 includes three apertures 40A-40C formed in shield substrate 42. Apertures 40A-40C extend through shield substrate 42 from top surface 48 to bottom surface 50. Rather than being substantially planar, shield substrate 42 has curved top and bottom surfaces 48 and 50 which may match the curvature of blisk rotor 32 when shield member 65 is positioned around multiple partial and/or full blades of, e.g., blisk 28.

In some examples, rather being positioned around a single partial blade 36, shield member 65 may be positioned around three partial blades adjacent to each other on the outer perimeter of blisk rotor 32. Each of the partial blades may be similar to partial blade 36 and each of the partial blades may extend through a respective one of apertures 40A-40C so that shield substrate 42 at least partially surrounds the perimeter of each partial blade, e.g., in the same orientation described for shield member 25 and partial blade 36. While shield member 65 is positioned around the partial blades in such a manner, a DED process may be used to build up the blade to repair or otherwise form the blades as described herein. Shield member 65 may function similar to that described for shield member 25 during the DED process. In other examples, one or more of apertures 40A-40C may be occupied with a full blade that does not need repair during the DED process.

As shown in FIGS. 6A and 6B, shield substrate 42 of shield member 65 includes first portion 62A and second portion 62B, which may be separated from each other along interface 64. To position shield member 65 around three full and/or partial blades, first portion 62A and second portion 62B of shield substrate 42 may be separated along interface 64 and then reassembled around three full or partial blades, e.g., with respective full blades occupying each of apertures 40A-40C. Alternatively, first portion 62A and second portion 62B of shield substrate 42 may be attached to each other when placed over partial and/or full blades but then detached from each other along interface 64 after the DED process to build one or more of the blades to remove shield member 65. First portion 62A and second portion 62B may be detachably coupled to each other in any suitable manner. For example, first portion 62A and second portion 62B may be mechanically fastened to each other using one or more fasteners or removably coupled to each other using magnets or otherwise using magnetic forces. In some examples, the configuration of first portion 62A and second portion 62B of shield substrate 42 may be referred to as a clam-shell configuration.

As noted above, in some examples, a shield member in accordance with some examples of the disclosure may be formed of a uniform composition throughout the shield substrate. In other examples, the shield substrate may have multiple discrete portions having different compositions. FIG. 7 is a conceptual diagram illustrating another example shield member 75. Shield member 75 may be substantially similar to examples of shield member 65 described herein and like features are similarly numbered. However, shield substrate 42 of shield member 75 is divided into a plurality of discrete sections 66 and 68. First sections 66 surround apertures 40A-40C and are separated by second sections 68. First and second sections 66 and 68 combine to form substrate 42.

First sections 66 may have a different composition that second sections 68. In some examples, first sections 66 may be formed of a ceramic composition such as alumina or boron nitride (e.g., as a high temperature material and/or a material that is chemically compatible with the adjacent portions of blisk 28), and second sections 68 maybe formed of a high thermal conductivity material such as copper or aluminum (e.g., to provide a surface onto which material splatter may cool relatively quickly). Additionally, or alternatively, shield member 65 may have a surface layer such as layer 70 indicated in FIG. 5, that has a discrete composition, such as a high thermal conductivity material composition or other composition described herein with the remaining portions of shield substrate 42 having a different composition.

Figure 8:
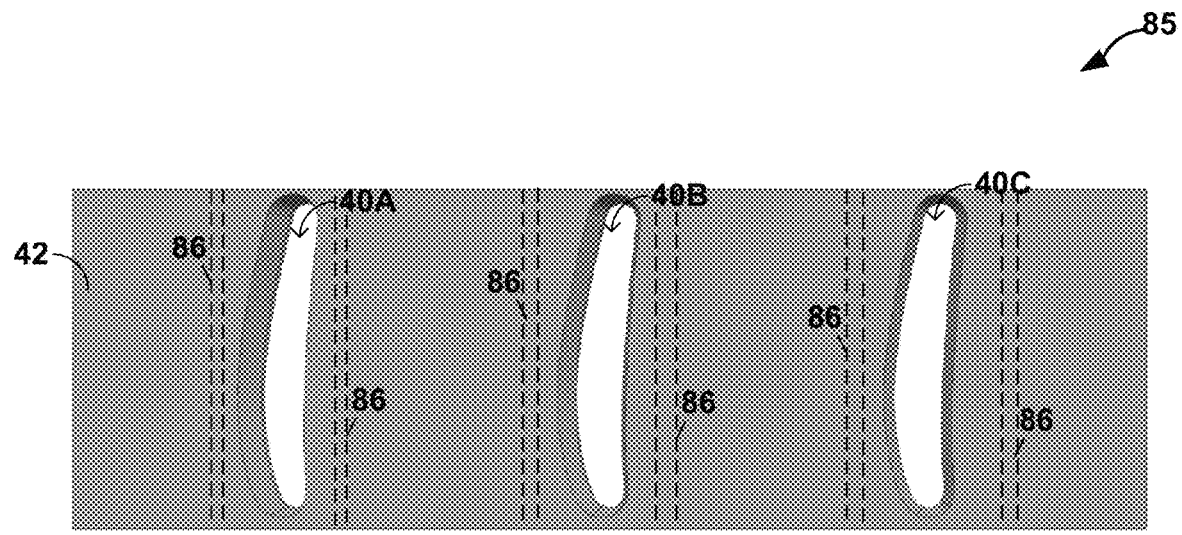
FIG. 8 is a conceptual diagram illustrating another example shield member.

FIG. 8 is a conceptual diagram illustrating another example shield member 85. Shield member 85 may be substantially similar to examples of shield member 65 described herein and like features are similarly numbered. However, shield substrate 42 of shield member 85 includes passageways 86 extending through substrate 42 adjacent to apertures 40A-40C. To cool substrate 42 and/or partial/full blades of blisk extending through apertures 40A-40C during a DED process, a fluid may flow through passageways 86.

For example, the cooling fluid may remove heat from shield substrate 42 that results from laser reflection or other heating caused by energy source 29. Additionally, or alternatively, the cooling fluid may remove heat from shield substrate 42 that results from heat transferred to shield substrate 42 from the blades within apertures 40A-40C, which removes heat from the blades within apertures 40A-40C to cool those portions of blisk 28 during the DED process. In some examples, cooling passageways 86 may be concentrated adjacent to apertures 40A-40C while in other examples, passageways 86 may be evenly distributed throughout shield substrate 42. While the example of FIG. 8 shows multiple passageways 86 through substrate 42, in other examples, a single continuous passageway may be formed in substrate 42 along any desired path.

In some examples, the cooling fluid may be a liquid or gas. The fluid may be actively pumped through passageways 86, e.g., under the control of computing device 26, or may flow through passageways 86 using gas pressure, e.g., in the case of a compressed gas supplied to passageways 86, e.g., under the control of computing device 26. In some examples, computing device 26 may be configured to control the flow of cooling fluid through passageways 86 to maintain substrate 42 and/or the portion of blisk extending through apertures 40A-40C below a threshold temperature level (e.g., by adjusting the flow rate of the fluid to control the amount of heat transferred into the fluid from substrate 42 and/or blisk 28.

Figure 9:
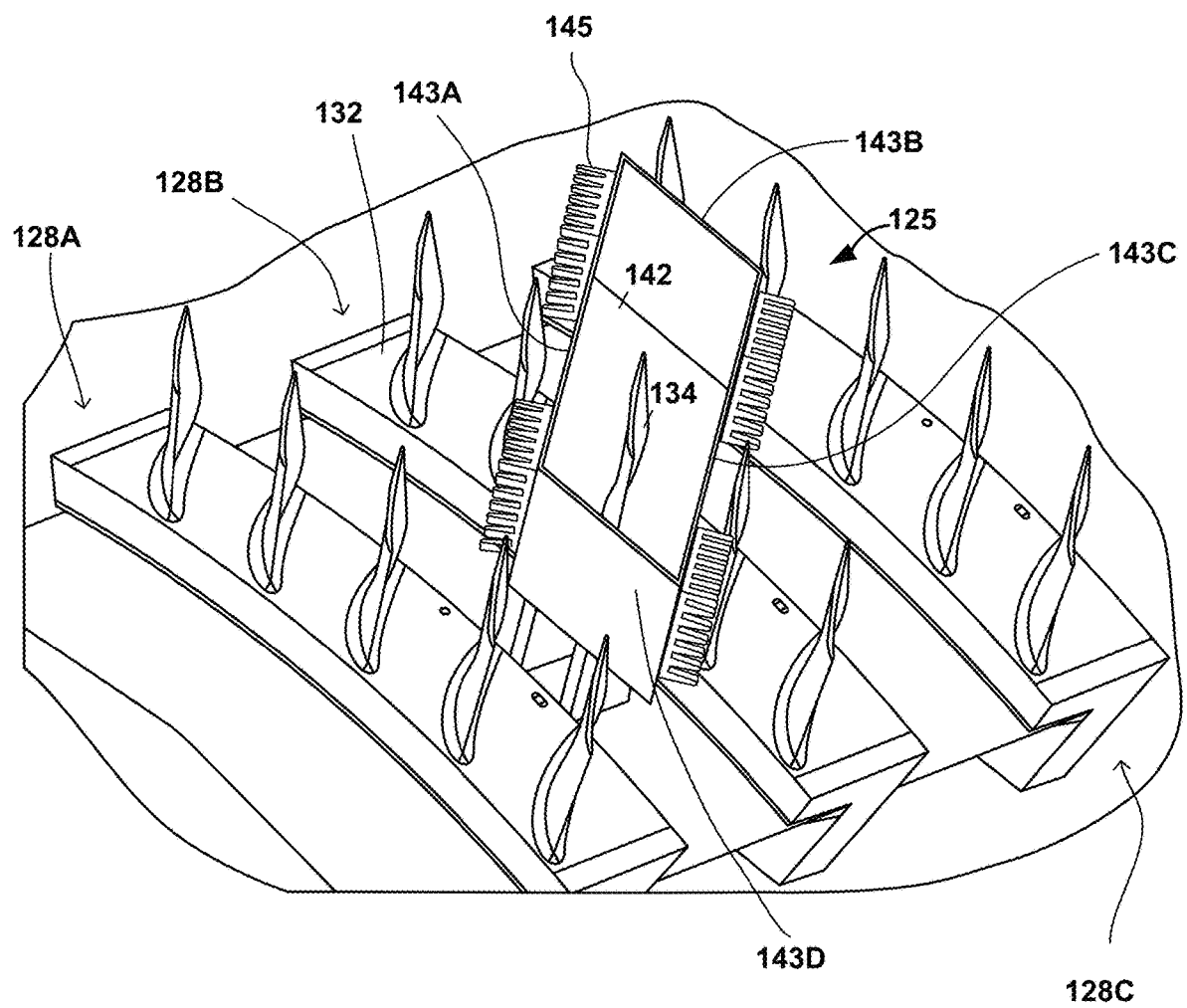
FIG. 9 is a conceptual diagram illustrating another example shield member.

FIG. 9 is a conceptual diagram illustrating another example shield member 125. Shield member 125 may be substantially similar to examples of shield member 25 described herein (e.g., with regard to FIGS. 4 and 5) and like features are similarly numbered. Shield member 25 is shown positioned around blade 36 of blisk 128B of an assembly including multiple blisks. For example, as partially shown in FIG. 9, the blisk 128B is adjacent to neighboring blisks 128A and 128C. Each of blisks 128A-128C includes a plurality of blades (such as blade 134) extending from a rotor disk (such as rotor disk 132). Each blisk may define a respective stage of a multi-stage compressor.

In the example of FIG. 9, shield member 125 includes shield substrate 132 with blade 134 (which may be a partial/damaged blade) extending through an aperture (not labelled in FIG. 9) in shield substrate 132. As described herein, shield member 25 may be positioned around blade 134 to shield portions of blisk 128B as well as blisks 128A and 128C, e.g., during a DED process to repair partial blade 36.

Unlike that of shield member 25 of FIGS. 4 and 5, shield member 125 includes walls 143A-143D surrounding the perimeter of shield substrate 142. Walls 143A-143D (collectively "wall 143") extend vertically from shield substrate 142 (extending in the same direction as the build direction and/or in a direction substantially parallel to the direction from which blade 134 extends from rotor disk 132). Walls 143A-143D of shield member 125 may function to further protect blade disk 132 and the blades of blisk 128B adjacent to blade 134, as well neighboring blisks 128A and 128C, e.g., during an additive manufacturing process to build or rebuild all or a portion of blade 134. In the example of FIG. 9, wall 143 extends around the entire outer perimeter of blade 134. In other examples, wall 143 may only extends around a portion of the perimeter of blade 134.

Shield member 125 also includes a plurality of cooling structures (such as cooling fin structure 145) on wall 143. Each cooling structure includes a plurality of cooling fins extending away from wall 143 to increase the surface area available to exchange heat with the external environment. This may help cool walls 143 and/or shield substrate 142, e.g., during an additively manufacturing process on blade 134 in the manner described herein. In the examiner of FIG. 9, shield member 125 includers for distinct cooling structures 145 although any suitable number may be employed. In some examples, substantially all or only a portion of the outer surface of wall 143 may be covered by fins of cooling structure 145.

Shield substrate 142, wall 143, and cooling structure 145 may be formed of any suitable materials. In some examples, substrate 142, wall 143 and cooling structure 145 are formed of the same or different materials. In some examples, shield substrate 142, wall 143, and/or cooling structure 145 may be formed of copper, aluminum, or other high thermal conductivity material (e.g., a thermal conductivity of at least about 100 W/mK).

Figure 10A:
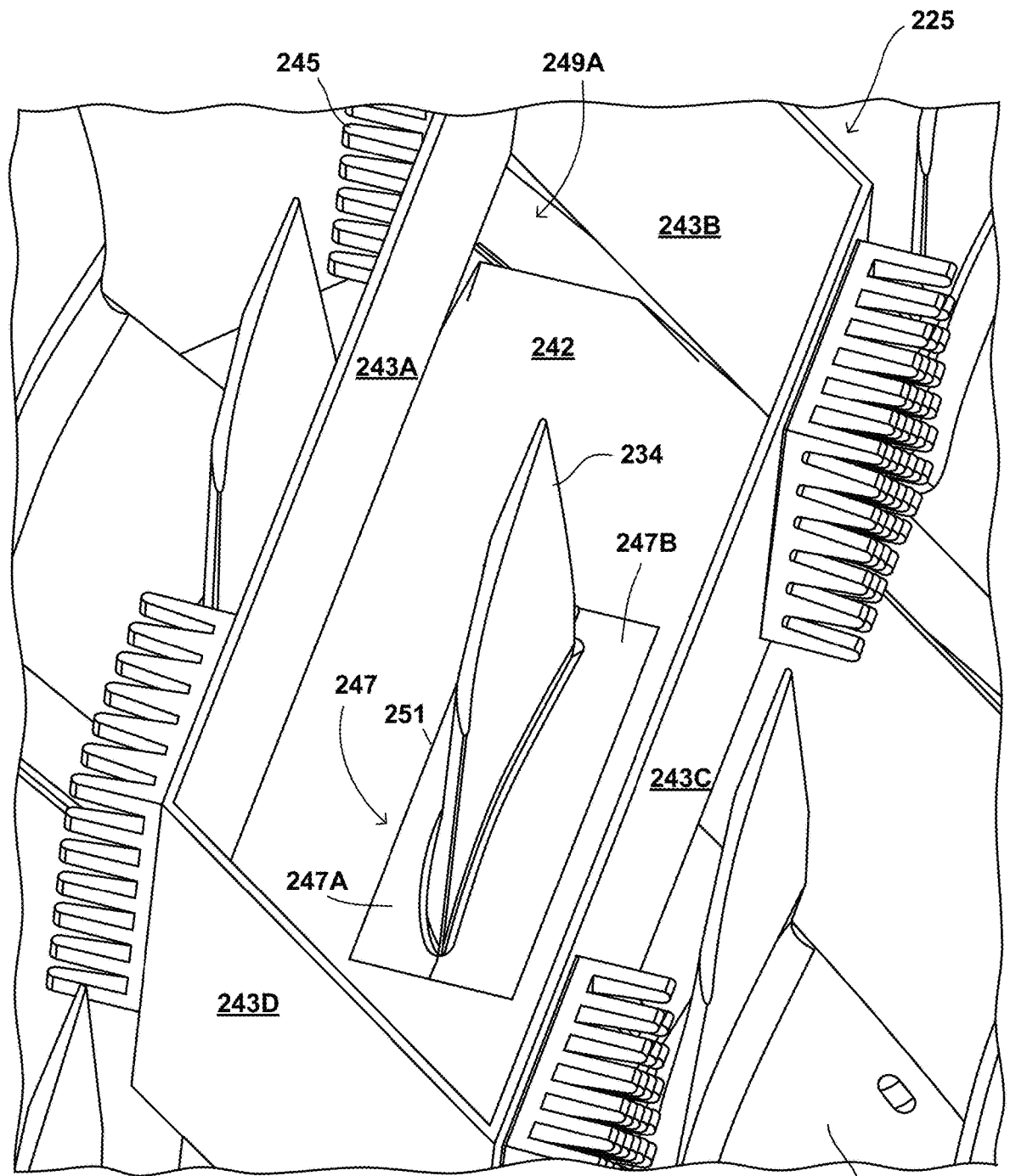
FIGS. 10A and 10B are conceptual diagrams illustrating another example shield member.
Figure 10B:
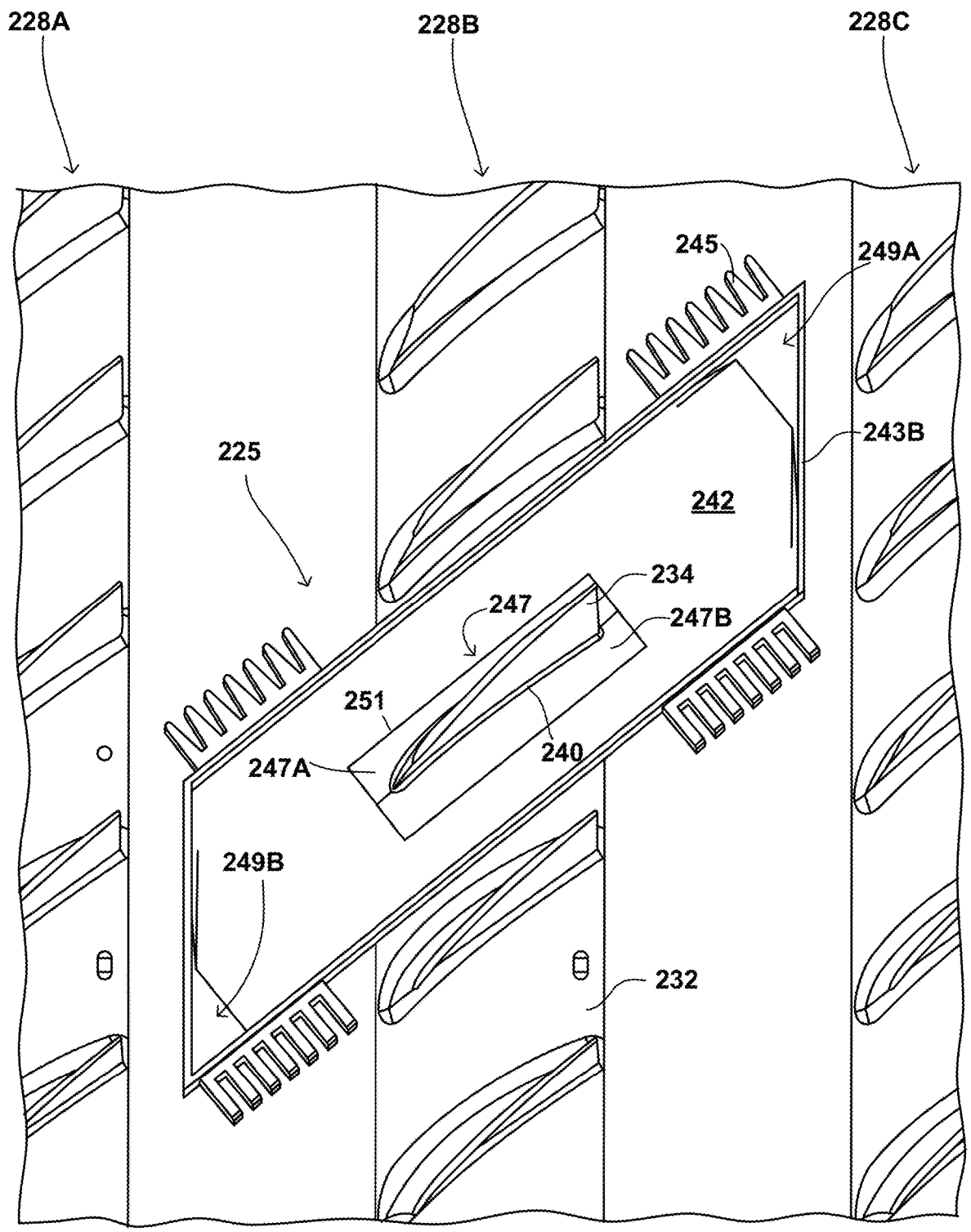

FIGS. 10A and 10B are conceptual diagram illustrating another example shield member 225. FIG. 10A shows a perspective view and FIG. 10B shows an overhead or plan view. Shield member 125 may be substantially similar to examples of shield member 25 described herein (e.g., with regard to FIGS. 4 and 5) and like features are similarly numbered (e.g., with cooling structure 245 being the same or substantially similar to cooling structure 145). Like that in FIG. 9, shield member 225 is positioned around blade 234 of blisk 228B, with blisk 228B being located between blisk 228A and 228C. Shield member 225 includes shield substrate 242 with wall 243 extending vertically from the plane of substrate 242. Wall 243 includes four cooling structures 245.

Unlike that of shield member 125, shield member 225 includes insert 247 located in opening 251 formed in shield substrate 242. Insert 247 includes first insert portion 247A and second insert portion 247 which combine to fit within opening 251. The combination of insertion portions 247A and 247B form aperture 240 in which blade 234 is located. In this configuration, shield member 225 may be used to shield multiple different sized blades so long at the blades within opening 251 in substrate. For example, for a blade that has a smaller outer perimeter than blade 234, shield member 225 may be employed but with a different insert 247 (e.g., another two or multiple pieces insert which define another aperture that more closely fits the dimensions of the smaller blade. In this manner, shield member 225 may be used for different sized blades with only different inserts being used for the different blades.

Insert 247 may be formed of a material that is the same or different than substrate 242. In some examples, insert 247 may be made from a material that is chemically compatible with the blisk 228B and/or blade 234 or the same material as blisk 228B and/or blade 234. Example materials for insert 247 may include titanium alloys such as Ti-6Al-2Sn-4Zr-2Mo, Ti-6Al-2Sn-4Zn-6Mo, and Ti-6Al-4V, or nickel alloys such as Inconel 718, RR1000, and Inconel 792. In some examples, all or a portion of insert 247 may be formed of (e.g., comprise, consist, or consist essentially of) a ceramic such as alumina ($Al_2O_3$) or boron nitride (BN) or other chemically inert material (e.g., as a barrier layer that defines a surface portion of substrate 42) to prevent interdiffusion and/or contamination of the blisk. All or a portion of insert 247 may be formed of a material that is chemically compatible with the composition of partial blade 234 and/or the composition of the material being deposited on build surface using the DED process. For example, the material may be non-reactive with the blisk/blade material or the same material as the blisk/blade material. Substrate 242 may be formed of a the same or similar material.

Unlike shield member 125, shield member 225 also includers openings 249A and 249B at edge locations of substrate 242. Such openings may allow for excess powder or other material deposited during the additive manufacturing process to be removed from the surface of substrate 242. In some examples, the surface of substrate 242 may be sloped towards openings 249A and 249B to allow for gravity to assist in the removal of the power/other material through the openings. Shield member 225 may include one or multiple openings such as openings 249A and 249B.

Figure 11:
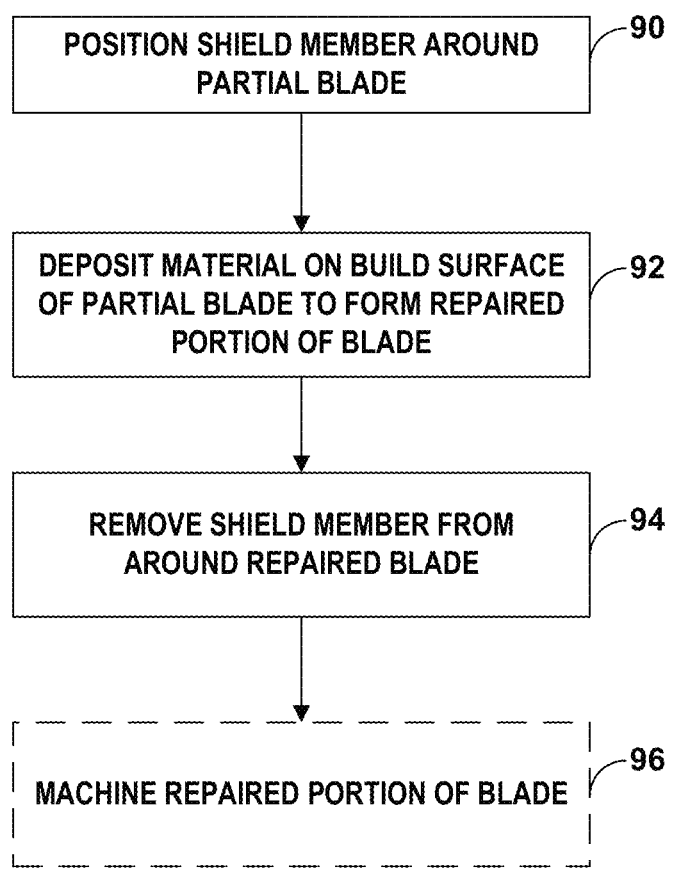
FIG. 11 is a flow diagram illustrating an example technique for repairing or otherwise forming all or a portion of a blade of a blisk using an additive manufacturing technique in accordance with the disclosure.

FIG. 11 is a flow diagram illustrating an example technique for repairing or otherwise forming all or a portion of a blade on a blisk. For ease of description, the example of FIG. 11 is described with regard a DED process carried out by system 10 to repair partial blade 36 of blisk 28 with shield member 25. However, the disclosure contemplates other examples beyond those described.

As shown in FIG. 11, shield member 25 may be positioned around partial blade 36 so that a portion of partial blade 36 extends through aperture 40 and shield substrate 42 surrounds perimeter 44 of partial blade 36 (90), e.g., in the configuration shown in FIGS. 3-5. Partial blade 36 may be a blade of blisk 28 that has been damaged (e.g., by a bird strike or other impact from a foreign objection during operation of a gas turbine engine that employs blisk 28 as a component). The damage may be repair by building a repair portion onto build surface 31 of partial blade 36, e.g., to restore the blade to its original form. In some examples, a damage portion of the blade may be cut away or otherwise removed to leave partial blade 36 with build surface 31. Before building up the material on build surface 31, surface 31 may be prepared using any suitable technique to help the material bond to surface 31.

Once shield member 36 is positioned around partial blade 36, system 10 may deposit material on build surface 31 to form repaired portion 54 (92). System 10 may build the repaired portion of the blade on build surface 31 using a DED process such as that described above with regard to system 10 of FIG. 1. For example, material from material delivery device 30 may be delivered to a melt pool formed on build surface 31 by energy beam 29 from energy source 22, which may be subsequently cooled to form a layer of the deposited material. One or more successive layers of material may be built up on surface 31 using this process to form the repaired portion 54 (or some approximation of the desired repaired portion 54). Due to the complex geometry of the repaired portion 54 of the blade built on partial blade portion 36, the repaired portion 54 may be wholly or partly formed using additively manufacturing techniques such as a DED process. Other suitable AM techniques that may be employed include powder bed fusion techniques, hybrid deposition machine techniques (e.g., using both additive/subtractive steps), or fused filament fabrication techniques (e.g., using sinterable metallic powder loaded filament). Likewise, due to the complex geometry of shield member 25, shield member 25 may be wholly or partly formed using additively manufacturing techniques such as a DED process, powder bed fusion techniques, hybrid deposition machines techniques (e.g., using both additive/subtractive steps), or fused filament fabrication techniques (e.g., using sinterable metallic powder loaded filament).

Shield member 25 may remain around partial blade 36 during the DED process. In some examples, shield member 25 may be moved radially up partial blade 36 while the repaired portion 54 is being built, e.g., so that top surface 48 remains near the top build surface during the build process. In some examples, a cooling fluid may be delivered through passageways in substrate 42 of shield member 25 during the DED process to actively cool substrate 42 and/or partial blade 36, e.g., as described above.

Once repaired blade portion 54 is formed on partial blade portion 36, shield member 25 may be removed from partial blade 36 (94). The repaired portion 54 and/or partial blade 36 may then be optionally machined so that the resulting blade exhibits the desired geometry (96).

In one or more examples, the functions described herein may be implemented in hardware, software, firmware, or any combination thereof. If implemented in software, the functions may be stored on or transmitted over, as one or more instructions or code, a computer-readable medium or computer-readable storage device and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media or computer-readable storage device, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following clauses and claims.

Clause 1. A method comprising: positioning a shield member around a perimeter of a partial blade extending from a rotor disk of a bladed disk, the shield member being positioned adjacent to a build surface of the partial blade; and depositing, with the shield member around the perimeter of the partial blade, a material on the build surface using an additive manufacturing technique to form a repaired portion on the build surface of the partial blade.

Clause 2. The method of clause 1, wherein the shield member defines an aperture, and the partial blade extends through the aperture of the shield member in a radial direction from a rotor of the bladed disk.

Clause 3. The method of clause 1 or 2, wherein the shield member defines at least one cooling passageway, the method further comprising: cooling the shield member by passing a fluid through the cooling passageway while depositing the material on the build surface of the blade.

Clause 4. The method of clause 3, wherein cooling the shield member comprising controlling the flow of the fluid through the cooling passageway to control a temperature of the partial blade during the deposition of the material on the build surface.

Clause 5. The method of clause 3, wherein the fluid comprises a compressed gas.

Clause 6. The method of any one of clauses 1-5, wherein a portion of the aperture is chamfered such that a gap exists between a top surface of the shield member and the partial blade when the partial blade extends through the aperture in the shield member.

Clause 7. The method of any one of clauses 1-6, wherein the shield member is formed of composition including at least one of aluminum, copper, titanium alloy, nickel alloy, or a ceramic.

Clause 8. The method of any one of clauses 1-7, wherein the shield member includes a plurality of discrete sections each formed of a different composition.

Clause 9. The method of any one of clauses 1-8, wherein the plurality of discrete sections includes a first section that defines the aperture, the first section being formed of a composition including a ceramic.

Clause 10. The method of any one of clauses 1-9, wherein the plurality of discrete sections includes a first section that defines a top surface of the shield member, the first section being formed of a composition including at least one of copper or aluminum.

Clause 11. The method of any one of clauses 1-10, wherein the shield member including a first portion and a second portion, wherein positioning the shield member around a perimeter of a partial blade includes assembling the first portion and the second portion of the shield member around the perimeter of the partial blade.

Clause 12. The method of any one of clauses 1-11, further comprising adjusting a position of the shield member relative to the partial blade periodically during the formation of the repaired portion.

Clause 13. The method of any one of clauses 1-12, wherein the additive manufacturing technique comprises a directed energy deposition technique.

Clause 14. The method of any one of clauses 1-13, wherein depositing, with the shield member around the perimeter of the partial blade, the material on the build surface comprises: forming a melt pool on the build surface; and delivering the material to the melt pool to form a respective layer of material on the build surface when the melt pool cools.

Clause 15. The method of any one of clauses 1-14, wherein the shield member includes a shield substrate defining an opening, and an insert that fits within the opening of the shield substrate, wherein positioning the shield member around a perimeter of the partial blade includes: positioning the partial blade within an aperture in the insert; and positioning the opening of the shield substrate around the insert with the partial blade within the aperture of the insert.

Clause 16. The method of any one of clauses 1-15, wherein the shield member includes a shield substrate and a vertical wall around a perimeter of the shield substrate.

Clause 17. The method of clause 16, wherein the shield member includes at least one cooling structure including cooling fins located on the vertical wall of the substrate.

Clause 18. The method of any one of clauses 15-17, wherein the shield substrate is formed from a first material and the insert is formed of a second material that is different from the first material.

Clause 19. A system comprising: a bladed disk including a plurality of blades extending from a rotor disk, wherein at least one of the plurality of blades includes a partial blade portion; and a shield member configured to be positioned around a perimeter of a partial blade extending from the rotor disk of a bladed disk, the shield member being configured to be positioned adjacent to a build surface of the partial blade.

Clause 20. The system of clause 19, wherein the system is configured to perform the method of any one of clauses 1-18.

What is claimed is:

1. A method comprising:
positioning a shield member including an aperture, the aperture surrounding an entire outer a perimeter of a partial blade extending from a rotor disk of a bladed disk, the shield member being positioned adjacent to a build surface of the partial blade, wherein the partial blade extends through the aperture of the shield member in a radial direction from a rotor of the bladed disk; and
depositing, with the shield member around the entire outer perimeter of the partial blade, a material on the build surface using an additive manufacturing technique to form a repaired portion on the build surface of the partial blade.

2. The method of claim 1, wherein the shield member defines at least one cooling passageway, the method further comprising:
cooling the shield member by passing a fluid through the cooling passageway while depositing the material on the build surface of the blade.

3. The method of claim 2, wherein cooling the shield member comprising controlling the flow of the fluid through the cooling passageway to control a temperature of the partial blade during the deposition of the material on the build surface.

4. The method of claim 2, wherein the fluid comprises a compressed gas.

5. The method of claim 1, wherein a portion of the aperture is chamfered such that a gap exists between a top surface of the shield member and the partial blade when the partial blade extends through the aperture in the shield member.

6. The method of claim 1, wherein the shield member is formed of composition including at least one of aluminum, copper, titanium alloy, nickel alloy, or a ceramic.

7. The method of claim 1, wherein the shield member includes a plurality of discrete sections each formed of a different composition.

8. The method of claim 7, wherein the plurality of discrete sections includes a first section that defines the aperture, the first section being formed of a composition including a ceramic.

9. The method of claim 7, wherein the plurality of discrete sections includes a first section that defines a top surface of the shield member, the first section being formed of a composition including at least one of copper or aluminum.

10. The method of claim 1, wherein the shield member includes a first portion and a second portion, wherein positioning the shield member around the entire outer perimeter of a partial blade includes assembling the first portion and the second portion of the shield member around the perimeter of the partial blade.

11. The method of claim 1, further comprising adjusting a position of the shield member relative to the partial blade periodically during the formation of the repaired portion.

12. The method of claim 1, wherein the additive manufacturing technique comprises a directed energy deposition technique.

13. The method of claim 1, wherein depositing, with the shield member around the perimeter of the partial blade, the material on the build surface comprises:
   forming a melt pool on the build surface; and
   delivering the material to the melt pool to form a respective layer of material on the build surface when the melt pool cools.

14. The method of claim 1, wherein the shield member includes a shield substrate defining an opening, and an insert that fits within the opening of the shield substrate, wherein positioning the shield member around the entire outer perimeter of the partial blade includes:
   positioning the partial blade within an aperture in the insert; and
   positioning the opening of the shield substrate around the insert with the partial blade within the aperture of the insert.

15. The method of claim 1, wherein the shield member includes a shield substrate and a vertical wall around a perimeter of the shield substrate.

16. The method of claim 15, wherein the shield member includes at least one cooling structure including cooling fins located on the vertical wall of the substrate.

17. The method of claim 14, wherein the shield substrate is formed from a first material and the insert is formed of a second material that is different from the first material.

18. A method comprising:
   positioning a shield member that includes an aperture around a perimeter of a partial blade extending from a rotor disk of a bladed disk, the shield member being positioned adjacent to a build surface of the partial blade; and
   depositing, with the shield member around the perimeter of the partial blade, a material on the build surface using an additive manufacturing technique to form a repaired portion on the build surface of the partial blade, wherein a portion of the aperture is chamfered such that a gap exists between a top surface of the shield member and the partial blade when the partial blade extends through the aperture in the shield member.

19. A method comprising:
   positioning a shield member around a perimeter of a partial blade extending from a rotor disk of a bladed disk, the shield member being positioned adjacent to a build surface of the partial blade; and
   depositing, with the shield member around the perimeter of the partial blade, a material on the build surface using an additive manufacturing technique to form a repaired portion on the build surface of the partial blade, wherein the shield member includes a shield substrate and a vertical wall around a perimeter of the shield substrate, and wherein the shield member includes at least one cooling structure including cooling fins located on the vertical wall of the substrate.

* * * * *